Patented May 13, 1947

2,420,382

UNITED STATES PATENT OFFICE 2,420,382

CATALYTIC REDUCTION OF ORGANIC CHLORO-NITRO COMPOUNDS

James A. Robertson, Elsmere, Del., assignor to E. I. du Pont de Nemours & Company, Wilmington, Del., a corporation of Delaware No Drawing. Application August 25, 1945, Serial No. 612,707

6 Claims. (Cl. 260—566)

This invention relates to a novel process for preparing certain reduction products of chloronitro compounds.

The general method for the preparation of chloro-nitro compounds of the type used is described by L. Henry, Cent. 1898, I, 192.

Various oximes and substituted hydroxylamines have assumed considerable importance as intermediates in the production of commercial materials. A well known method for the preparation of oximes involves the reaction of aldehydes or ketones with hydroxylamine, with formation of aldoximes or ketoximes respectively. Oximes may also be made by the reduction of aliphatic nitrocompounds with stannous chloride in hydrochloridic acid. N-substituted alkylhydroxylamines are likewise produced by various chemical methods for the reduction of nitrocompounds. The prior art methods, however, are generally not adapted to commercial operations, or possess disadvantages that make them undesirable because of low yields, complicated procedures, or other reasons.

An object of the present invention is a new and improved method for the production of oximes and substituted hydroxylamines. A further object is a method for the reduction of chloro-nitrocompounds and the preparation of oximes and hydroxylamines therefrom. A still further object is an efficient catalytic hydrogenation process for such production. Additional objects will be disclosed as the invention is described more fully hereinafter.

I have found that the foregoing objects are accomplished when hydrogen is reacted with an organic nitrocompound having a halogen atom and a nitro group attached to the same carbon atom and the reaction is carried out in the substantial absence of an aqueous medium and in the presence of a platinum metal hydrogenation catalyst. Desirably a volatile organic solvent is present in the reaction vessel. While the invention has been broadly stated to involve compounds having a halogen group on the same carbon atom with the nitro group, chloro-nitro compounds will be the ones ordinarily treated because of their greater attractiveness economically and the favorable results obtained.

The following will serve as specific examples to illustrate the procedure of the invention. It will be understood that these are not limiting in any way. The amounts used are parts by weight, unless otherwise stated.

Example 1

A quantity of 1-chloro-1-nitrocyclohexane was prepared by chlorination of nitrocyclohexane under suitable conditions. The chloro-nitro compound had a boiling point of 81–82° C./8 mm.

A mixture of 16.35 parts of the above 1-chloro-1-nitrocyclohexane, 100 parts by volume of methanol and 1.63 parts of 10% palladium-on-charcoal was introduced into a Pyrex pressure bottle and subjected to a hydrogen pressure of 40 lb. at room temperature. Agitation was started and 0.4 part of hydrogen was absorbed during 20 minutes. The contents of this bottle were discharged, the catalyst removed by filtration, and the filtrate neutralized with an aqueous solution of 6.9 parts of potassium carbonate. The filtrate was evaporated to dryness under reduced pressure. The residue was dissolved in an aqueous solution of sodium hydroxide and precipitated by acidification with hydrochloric acid. The white solid, cyclohexanone oxime, was collected on a filter and dried. It had a melting point of 89.5° C. and the yield was 8.5 parts, 75% of theoretical.

In another preparation of cyclohexanone oxime, by a similar procedure but starting with separately prepared 1-chloro-1-nitrocyclohexane, a yield of 80% was obtained.

Example 2

Eight parts of 1-chloro-1-nitrocyclohexane, 50 parts by volume of ethanol (95%), and 0.16 part of platinum oxide were mixed in a Pyrex pressure bottle and subjected to 40 lb. hydrogen pressure at room temperature. During ½ hour, 0.3 part of hydrogen was absorbed, and the contents of the bottle were then discharged. The catalyst was removed by filtration and the filtrate evaporated to dryness under reduced pressure. The residual white solid, identified as cyclohexylhydroxylamine hydrochloride with a melting point of 142° C., weighed 6.5 parts, which was 80% of the theoretical yield.

Example 3

A Pyrex pressure bottle was charged with 12.3 parts of 2-chloro-2-nitropropane, 87 parts by volume of methanol, and 1.23 parts of 10% palladium-on-charcoal. The contents were subjected to 40 lb. hydrogen pressure. Four-tenth part of hydrogen was absorbed during ½ hour, after which the contents were discharged. The catalyst was removed by filtration and the filtrate neutralized with an aqueous solution of 6.9 parts of potassium carbonate. After drying under reduced pressure, the residue consisted of 3 parts of acetone oxime, with a melting point of 56–58° C., the yield amounting to 36% of the theoretical.

The foregoing examples have cited some specific chloronitrocompounds that have been used in the preparation of oximes and substituted hydroxylamines in accordance with the invention. It will be understood, however, that many other such compounds are likewise suitable, a requirement being that the chlorine or other halogen atom shall be attached to the same carbon atom as is the nitro group. The following additional materials may be employed in similar manner: 2-chloro-2-nitrobutane, 2-methyl-3-chloro-3-nitrobutane, 2-bromo-2-nitrobutane, 1-phenyl-2-chloro-2-nitropropane, 1-phenyl-1-chloro-1-nitroethane, 9-chloro-9-nitrofluorene, and many others.

The use of a solvent in the reaction vessel is not essential, and the process will always be carried out in the substantial absence of an aqueous medium. Desirably, however, an organic solvent will be present, for example, a saturated lower aliphatic alcohol, an ether, or a hydrocarbon. Specific solvents which are suitable are methanol, ethanol, propanol, dioxan, cyclohexane, and the like.

The process of the invention is operable at temperatures up to 100° C. Preferably I operate in the range 25–50° C. While the reaction may be carried out at atmospheric pressure, superatmospheric pressure will ordinarily be employed, generally in excess of 30 lb. per square inch, as a practical rate of reaction is obtained under such pressure conditions. The upper limit is determined by the structural limitations of the equipment used, and may be as high as 1000–5000 lb. per square inch.

As has been stated, the process is carried out in the presence of a platinum metal hydrogenation catalyst. This is a well-understood class of metals and includes platinum, iridium, osmium, palladium, rhodium, and ruthenium, both the free metals and their oxides and salts being applicable. In many cases it will be desirable to have the catalyst supported on a carrier of suitable material. The catalyst used will be largely dependent on the reduction product desired. When the preparation of oximes is intended, I desirably employ finely divided palladium, which may advantageously be supported on charcoal, alumina, silica gel, or other material. If on the other hand, N-substituted hydroxylamines are desired as products, finely divided platinum, in the form of the free metal, its oxides or salts, is preferably used. An amount of catalyst is chosen that will bring about reaction at the desired rate, and between 0.01 and 10.0% by weight of the chloronitro compound may be used. When reduction is desired at a rapid rate and at relatively low temperature, an amount of 1 to 10% is desirable. If, on the other hand, catalyst economy is important, the catalyst may advantageously be extended by support on a carrier such as charcoal, and an amount between 0.01% and 1.0% is suitable.

The invention has described an improved method for the preparation, from chloro-nitro compounds, of oximes and substituted hydroxylamines. These products are useful intermediates in the synthesis of polymeric organic compounds, pharmaceuticals, and insecticides, etc. While the process has been disclosed adequately, it will be understood that many variations in details of procedures, compositions and the like may be introduced without departure from the scope of the invention. I intend to be limited only by the following claims.

I claim:
1. The process for the catalytic reduction of nitrocompounds which comprises reacting hydrogen with an organic nitrocompound having a halogen atom and a nitro group attached to the same carbon atom, the remainder of the compound consisting solely of carbon and hydrogen, and effecting the reaction in the substantial absence of an aqueous medium in the presence of a platinum group metal hydrogenation catalyst.

2. The process of claim 1 in which the reaction is carried out at superatmospheric pressure.

3. The process for the catalytic reduction of nitrocompounds to produce a hydroxylamine which comprises reacting hydrogen with an organic nitrocompound having a halogen atom and a nitro group attached to the same carbon atom, the remainder of the compound consisting solely of carbon and hydrogen, and effecting the reaction in the substantial absence of an aqueous medium and in the presence of a platinum catalyst.

4. The process for the catalytic reduction of nitrocompounds to produce an oxime which comprises reacting hydrogen with an organic nitrocompound having a halogen atom and a nitro group attached to the same carbon atom, the remainder of the compound consisting solely of carbon and hydrogen, and effecting the reaction in the substantial absence of an aqueous medium in the presence of a palladium catalyst.

5. The process of producing cyclohexylhydroxylamine which comprises reacting 1-chloro-1-nitrocyclohexane with hydrogen in the presence of a platinum catalyst.

6. The process of producing cyclohexanone oxime which comprises reacting 1-chloro-1-nitrocyclohexane with hydrogen in the presence of a palladium catalyst.

JAMES A. ROBERTSON.

REFERENCES CITED

The following references are of record in the file of this patent:

UNITED STATES PATENTS

| Number | Name | Date |
| --- | --- | --- |
| 1,907,820 | Jaeger | May 9, 1933 |

Certificate of Correction

Patent No. 2,420,382.                                                                                                  May 13, 1947.

JAMES A. ROBERTSON

It is hereby certified that error appears in the printed specification of the above numbered patent requiring correction as follows: Column 1, lines 15 and 16, for "hydrochloridic" read *hydrochloric*; and that the said Letters Patent should be read with this correction therein that the same may conform to the record of the case in the Patent Office.

Signed and sealed this 8th day of July, A. D. 1947.

[SEAL]

LESLIE FRAZER,
*First Assistant Commissioner of Patents.*